United States Patent
Schevciw et al.

(10) Patent No.: US 11,395,083 B2
(45) Date of Patent: Jul. 19, 2022

(54) SCALABLE UNIFIED AUDIO RENDERER

(71) Applicant: QUALCOMM Incorporated, San Diego, CA (US)

(72) Inventors: Andre Gustavo P. Schevciw, San Diego, CA (US); Nils Günther Peters, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 453 days.

(21) Appl. No.: 16/264,115

(22) Filed: Jan. 31, 2019

(65) Prior Publication Data
US 2019/0239015 A1 Aug. 1, 2019

Related U.S. Application Data

(60) Provisional application No. 62/625,230, filed on Feb. 1, 2018.

(51) Int. Cl.
*H04S 3/00* (2006.01)
*G10L 19/008* (2013.01)
(Continued)

(52) U.S. Cl.
CPC ............ *H04S 3/006* (2013.01); *G02B 27/017* (2013.01); *G10L 19/008* (2013.01); *H04R 1/10* (2013.01);
(Continued)

(58) Field of Classification Search
CPC combination set(s) only.
See application file for complete search history.

(56) References Cited

U.S. PATENT DOCUMENTS 9,865,274 B1 * 1/2018 Vicinus ................. G10L 19/20
9,992,602 B1 * 6/2018 Allen ...................... H04S 7/303
(Continued)

FOREIGN PATENT DOCUMENTS

CN         105103570 A    11/2015

OTHER PUBLICATIONS

Gerald Enzner, Advanced System options for binaural rendering of ambisonic format, pp. 251-255, May 26-31, 2013 (Year: 2013).*

(Continued)

*Primary Examiner* — Duc Nguyen
*Assistant Examiner* — Assad Mohammed
(74) *Attorney, Agent, or Firm* — Qualcomm Incorporated

(57) ABSTRACT

In general, techniques are described by which to support scalable unified audio rendering. A device comprising an audio decoder, a memory, and a processor may be configured to perform various aspects of the techniques. The audio decoder may decode, from a bitstream, first audio data and second audio data. The memory may store the first audio data and the second audio data. The processor may render the first audio data into first spatial domain audio data for playback by virtual speakers at a set of virtual speaker locations, and render the second audio data into second spatial domain audio data for playback by the virtual speakers at the set of virtual speaker locations. The processor may also mix the first spatial domain audio data and the second spatial domain audio data to obtain mixed spatial domain audio data, and convert the mixed spatial domain audio data to scene-based audio data.

22 Claims, 9 Drawing Sheets

(51) Int. Cl.
  H04S 1/00       (2006.01)
  H04R 1/10       (2006.01)
  G02B 27/01      (2006.01)
  H04S 7/00       (2006.01)

(52) U.S. Cl.
  CPC .............. *H04S 1/007* (2013.01); *H04S 3/008* (2013.01); *H04S 7/308* (2013.01); *H04R 2460/13* (2013.01); *H04S 2400/01* (2013.01); *H04S 2400/03* (2013.01); *H04S 2400/11* (2013.01); *H04S 2400/15* (2013.01); *H04S 2420/11* (2013.01)

(56) References Cited

U.S. PATENT DOCUMENTS

| | | | | |
|---|---|---|---|---|
| 2011/0211702 | A1* | 9/2011 | Mundt | H04S 7/30 381/17 |
| 2013/0322514 | A1* | 12/2013 | McGary | H04N 5/445 375/240.01 |
| 2016/0241980 | A1* | 8/2016 | Najaf-Zadeh | G06T 19/006 |
| 2018/0154253 | A1* | 6/2018 | Peterson | A63F 13/25 |

OTHER PUBLICATIONS

Gerald Enzner, Advanced System options for binaural rendering of ambisonic format, pp. 1, May 26-31, 2013 (Year: 2013).*

Herre J., et al., "MPEG-H 3D Audio-The New Standard for Coding of Immersive Spatial Audio," IEEE Journal of Selected Topics in Signal Processing, Aug. 1, 2015 (Aug. 1, 2015), vol. 9(5), pp. 770-779, XP055243182, US ISSN: 1932-4553, DOI: 10.1109/JSTSP. 2015.2411578 10 pp.

International Search Report and Written Opinion—PCT/US2019/016256—ISA/EPO—Apr. 10, 2019-04-10.

Neuendorf M., et al., "Updated to Proposed 2nd Edition of ISO/IEC 23008-3", 117, MPEG Meeting, Jan. 16, 2017-Jan. 20, 2017, Geneva, (Motion Picture Expert Group ISO/IEC JTC1/SC29/WG11), No. m39877, Jan. 12, 2017 (Jan. 12, 2017), XP030068222, cited in the application section 4.2, section 5.3.2, section 5.3.7, section 7.2, sections 12.1-12.4.4.4, sections 17.10.5.1-17.10.5.2, sections C.5.1-C.5.4.10, 3 Pages.

Poletti, "Three-Dimensional Surround Sound Systems Based on Spherical Harmonics," J. Audio Eng. Soc., vol. 53, No. 11, Nov. 2005, pp. 1004-1025.

"Information technology—High efficiency coding and media delivery in heterogeneous environments—Part 3: 3D Audio," ISO/IEC JTC 1/SC 29, ISO/IEC DIS 23008-3, Jul. 25, 2014, 433 pp.

"Information technology—High efficiency coding and media delivery in heterogeneous environments—Part 3: 3D Audio," ISO/IEC JTC 1/SC 29, ISO/IEC 23008-3:201x(E), Oct. 12, 2016, 798 pp.

Qualcomm Incorporated: "pCR to 26.118 on Definitions for VRStream audio," 3GPP TSG-SA WG4, S4-180139, Fukuoka, Japan, Feb. 5-9, 2018, 3 pages.

Qualcomm Inc., "Proposal for a Common Informative Reference Renderer," TSG SA4 #97 meeting, Tdoc S4-180140, Feb. 5-9, 2018, Fukuoka, Japan, 3 pages.

Qualcomm, Inc., "Definition of Equivalent Spatial Domain Representation," TSG SA4 #97 meeting, Tdoc S4-180141, Feb. 5-9, 2018 Fukuoa, Japan, 1 page.

* cited by examiner

SCALABLE UNIFIED AUDIO RENDERER

This application claims the benefit of U.S. Provisional Application No. 62/625,230, entitled "SCALABLE UNIFIED AUDIO RENDERER," filed Feb. 1, 2018, the entire contents of which are hereby incorporated by reference as if set forth in its entirety.

TECHNICAL FIELD

This disclosure relates to processing of media data, such as audio data.

BACKGROUND

A higher-order ambisonics (HOA) signal (often represented by a plurality of spherical harmonic coefficients (SHC) or other hierarchical elements) is a three-dimensional representation of a soundfield. The HOA or SHC representation may represent the soundfield in a manner that is independent of the local speaker geometry used to playback a multi-channel audio signal rendered from the SHC signal. The SHC signal may also facilitate backwards compatibility as the SHC signal may be rendered to well-known and highly adopted multi-channel formats, such as a 5.1 audio channel format or a 7.1 audio channel format. The SHC representation may therefore enable a better representation of a soundfield that also accommodates backward compatibility.

SUMMARY

This disclosure relates generally to auditory aspects of the user experience of computer-mediated reality systems, including virtual reality (VR), mixed reality (MR), augmented reality (AR), computer vision, and graphics systems.

In one example, various aspects of the techniques are directed to a device configured to support unified audio rendering, the device comprising: an audio decoder configured to decode, from a bitstream, first audio data for a time frame and second audio data for the time frame; a memory configured to store the first audio data and the second audio data; and one or more processors configured to: render the first audio data into first spatial domain audio data for playback by virtual speakers at a set of virtual speaker locations; render the second audio data into second spatial domain audio data for playback by the virtual speakers at the set of virtual speaker locations; mix the first spatial domain audio data and the second spatial domain audio data to obtain mixed spatial domain audio data; and convert the mixed spatial domain audio data to scene-based audio data.

In another example, various aspects of the techniques are directed to a method of supporting unified audio rendering, the method comprising: decoding, by a computing device and from a bitstream, first audio data for a time frame and second audio data for the time frame; rendering, by the computing device, the first audio data into first spatial domain audio data for playback by virtual speakers at a set of virtual speaker locations; rendering, by the computing device, the second audio data into second spatial domain audio data for playback by the virtual speakers at the set of virtual speaker locations; mixing, by the computing device, the first spatial domain audio data and the second spatial domain audio data to obtain mixed spatial domain audio data; and converting, by the computing device, the mixed spatial domain audio data to scene-based audio data.

In another example, various aspects of the techniques are directed to a device configured to support unified audio rendering, the device comprising: means for decoding, from a bitstream, first audio data for a time frame and second audio data for the time frame; means for rendering the first audio data into first spatial domain audio data for playback by virtual speakers at a set of virtual speaker locations; means for rendering the second audio data into second spatial domain audio data for playback by the virtual speakers at the set of virtual speaker locations; means for mixing the first spatial domain audio data and the second spatial domain audio data to obtain mixed spatial domain audio data; and means for converting the mixed spatial domain audio data to scene-based audio data.

In another example, various aspects of the techniques are directed to a non-transitory computer-readable storage medium having stored thereon instructions that, when executed, cause one or more processors to: decode, from a bitstream, first audio data for a time frame and second audio data for the time frame; render the first audio data into first spatial domain audio data for playback by virtual speakers at a set of virtual speaker locations; render the second audio data into second spatial domain audio data for playback by the virtual speakers at the set of virtual speaker locations; mix the first spatial domain audio data and the second spatial domain audio data to obtain mixed spatial domain audio data; and convert the mixed spatial domain audio data to scene-based audio data.

The details of one or more examples of this disclosure are set forth in the accompanying drawings and the description below. Other features, objects, and advantages will be apparent from the description, drawings, and from the claims.

DETAILED DESCRIPTION

Figure 1:
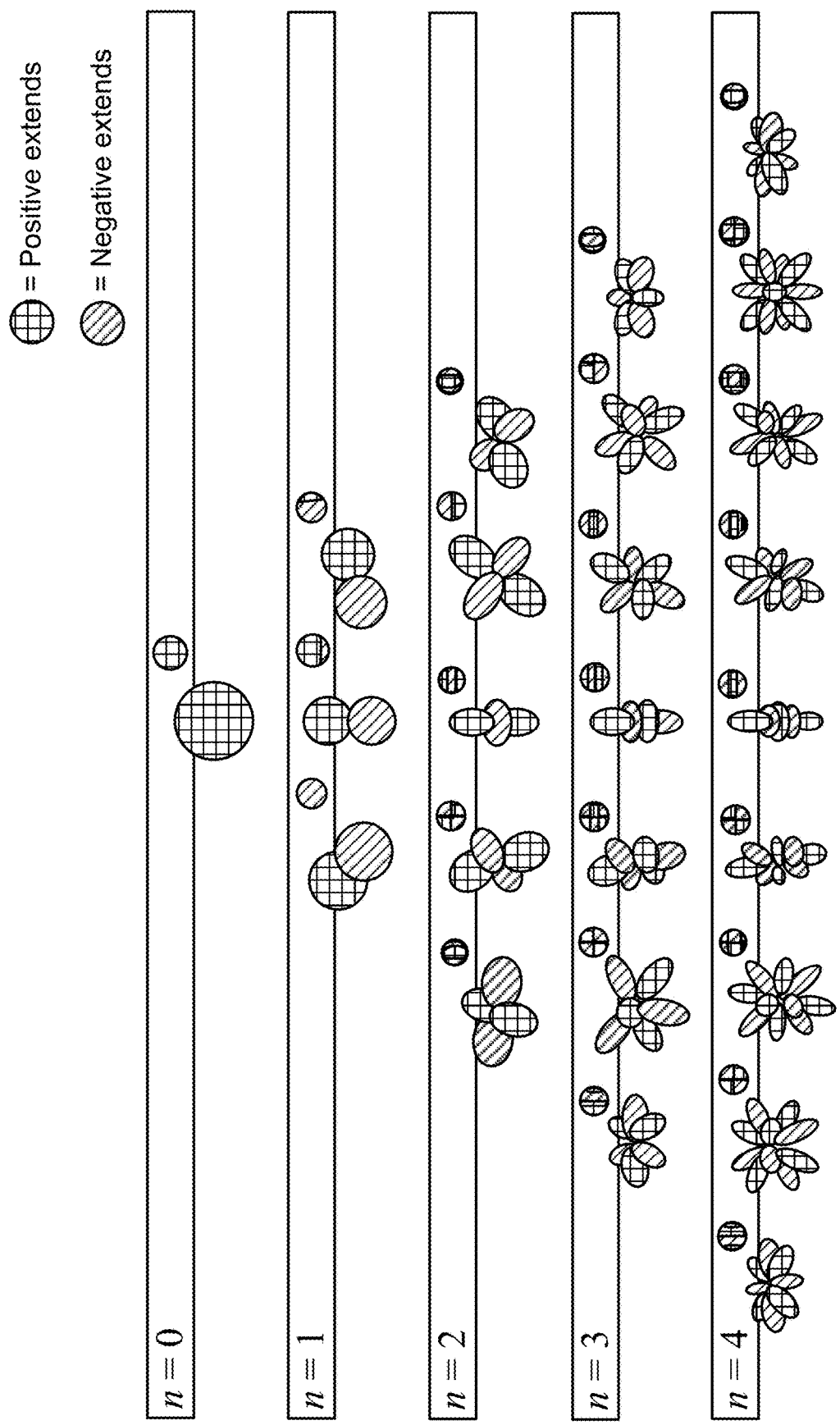
FIG. 1 is a diagram illustrating spherical harmonic basis functions of various orders and sub-orders.

In general, this disclosure is directed to techniques for playing back soundfield representations during a user experience of a computer-mediated reality system. Computer-mediated reality (CMR) technology includes various types of content-generating and content-consuming systems, such as virtual reality (VR), mixed reality (MR), augmented reality (AR), computer vision, and graphics systems. While several aspects of this disclosure are described with respect to virtual reality systems for ease of discussion by way of example, it will be appreciated that the techniques of this disclosure are also applicable to other types of computer-mediated reality technology, such as mixed reality, augmented reality, computer vision, and graphics systems.

Virtual reality systems may leverage a user's field of view (FoV) information to obtain video data associated with the user's FoV. As such, virtual reality systems may obtain video data that partially or fully surrounds a viewer's head, e.g., for virtual reality applications or other similar scenarios in which a user may move his or her head to see different parts of an image canvas that cannot be seen when directing focus at a single point of the canvas. In particular, these techniques may be applied when the viewer directs visual focus to a particular portion of a large canvas, such as a three-dimensional canvas that partially or fully envelops the viewer's head. Video data that envelops a user's head may be provided using a combination of screens (e.g., a set of screens that surround the user) or via head-mounted display.

Examples of hardware that can provide head-mounted displays include VR headsets, MR headsets, AR headsets, and various others. Sensing data and/or test data may be used to determine the users' FoV. As one example of sensing data, one or more angles associated with the positioning of a VR headset, which form a "steering angle" of the headset, may indicate the user's FoV. As another example of sensing data, a gaze angle of the user (sensed, for example, via iris detection) may indicate the user's FoV. The video data and the corresponding audio data may be encoded and prepared (e.g., for storage and/or transmission) using a set of characteristics, including the FoV information.

The techniques of this disclosure may be used in conjunction with techniques related to transmission (e.g., sending and/or receiving) of media data (such as video data and audio data) coded at various levels of quality for different regions at which the media data is to be played back. For example, the techniques of this disclosure may be used by a client device that includes a panoramic display (e.g., a display that partially or fully envelopes the head of a viewer) and surround sound speakers. In general, the display is configured such that a visual focus of a user is directed to only a portion of the display at a given time. The systems of this disclosure may render and output the audio data via the surround sound speakers such that audio objects associated with the present area of focus on the display are output with greater directionality than the remaining audio objects.

There are various 'surround-sound' channel-based audio formats in the market. They range, for example, from the 5.1 home theatre system (which has been the most successful in terms of making inroads into living rooms beyond stereo) to the 22.2 system developed by NHK (Nippon Hoso Kyokai or Japan Broadcasting Corporation). Content creators (e.g., Hollywood studios) would like to produce the soundtrack for a movie once, and not spend effort to remix it for each speaker configuration. A Moving Pictures Expert Group (MPEG) has released a standard allowing for soundfields to be represented using a hierarchical set of elements (e.g., Higher-Order Ambisonic—HOA—coefficients) that can be rendered to speaker feeds for most speaker configurations, including 5.1 and 22.2 configuration whether in location defined by various standards or in non-uniform locations.

MPEG released the standard as MPEG-H 3D Audio standard, formally entitled "Information technology—High efficiency coding and media delivery in heterogeneous environments—Part 3: 3D audio," set forth by ISO/IEC JTC 1/SC 29, with document identifier ISO/IEC DIS 23008-3, and dated Jul. 25, 2014. MPEG also released a second edition of the 3D Audio standard, entitled "Information technology—High efficiency coding and media delivery in heterogeneous environments—Part 3: 3D audio, set forth by ISO/IEC JTC 1/SC 29, with document identifier ISO/IEC 23008-3:201x(E), and dated Oct. 12, 2016. Reference to the "3D Audio standard" in this disclosure may refer to one or both of the above standards.

As noted above, one example of a hierarchical set of elements is a set of spherical harmonic coefficients (SHC). The following expression demonstrates a description or representation of a soundfield using SHC:

$$p_i(t, r_r, \theta_r, \varphi_r) = \sum_{\omega=0}^{\infty} \left[ 4\pi \sum_{n=0}^{\infty} j_n(kr_r) \sum_{m=-n}^{n} A_n^m(k) Y_n^m(\theta_r, \varphi_r) \right] e^{j\omega t},$$

The expression shows that the pressure $p_i$ at any point $\{r_r, \theta_r, \varphi_r\}$ of the soundfield, at time t, can be represented uniquely by the SHC, $A_n^m(k)$. Here, $$k = \frac{\omega}{c},$$

c is the speed of sound (~343 m/s), $\{r_r, \theta_r, \varphi_r\}$ is a point of reference (or observation point), $j_n(\cdot)$ is the spherical Bessel function of order n, and $Y_n^m(\theta_r, \varphi_r)$ are the spherical harmonic basis functions (which may also be referred to as a spherical basis function) of order n and suborder m. It can be recognized that the term in square brackets is a frequency-domain representation of the signal (i.e., $S(\omega, r_r, \theta_r, \varphi_r)$) which can be approximated by various time-frequency transformations, such as the discrete Fourier transform (DFT), the discrete cosine transform (DCT), or a wavelet transform. Other examples of hierarchical sets include sets of wavelet transform coefficients and other sets of coefficients of multiresolution basis functions.

FIG. 1 is a diagram illustrating spherical harmonic basis functions from the zero order (n=0) to the fourth order (n=4). As can be seen, for each order, there is an expansion of suborders m which are shown but not explicitly noted in the example of FIG. 1 for ease of illustration purposes.

The SHC $A_n^m(k)$ can either be physically acquired (e.g., recorded) by various microphone array configurations or, alternatively, they can be derived from channel-based or object-based descriptions of the soundfield. The SHC represent scene-based audio, where the SHC may be input to an audio encoder to obtain encoded SHC that may promote more efficient transmission or storage. For example, a fourth-order representation involving $(1+4)^2$ (25, and hence fourth order) coefficients may be used.

As noted above, the SHC may be derived from a microphone recording using a microphone array. Various examples of how SHC may be derived from microphone arrays are described in Poletti, M., "Three-Dimensional Surround Sound Systems Based on Spherical Harmonics," J. Audio Eng. Soc., Vol. 53, No. 11, 2005 November, pp. 1004-1025.

To illustrate how the SHCs may be derived from an object-based description, consider the following equation. The coefficients $A_n^m(k)$ for the soundfield corresponding to an individual audio object may be expressed as:

$$A_n^m(k) = g(\omega)(-4\pi i k) h_n^{(2)}(k r_s) Y_n^{m*}(\theta_s, \varphi_s),$$

where i is $\sqrt{-1}$, $h_n^{(2)}(\cdot)$ is the spherical Hankel function (of the second kind) of order n, and $\{r_s, \theta_s, \varphi_s\}$ is the location of the object. Knowing the object source energy g(w) as a function of frequency (e.g., using time-frequency analysis techniques, such as performing a fast Fourier transform on the PCM stream) allows us to convert each PCM object and the corresponding location into the SHC $A_n^m(k)$. Further, it can be shown (since the above is a linear and orthogonal decomposition) that the $A_n^m(k)$ coefficients for each object are additive. In this manner, a multitude of PCM objects can be represented by the $A_n^m(k)$ coefficients (e.g., as a sum of the coefficient vectors for the individual objects). Essentially, the coefficients contain information about the soundfield (the pressure as a function of 3D coordinates), and the above represents the transformation from individual objects to a representation of the overall soundfield, in the vicinity of the observation point $\{r_r, \theta_r, \varphi_r\}$. The remaining figures are described below in the context of object-based and SHC-based audio coding.

Figure 2:
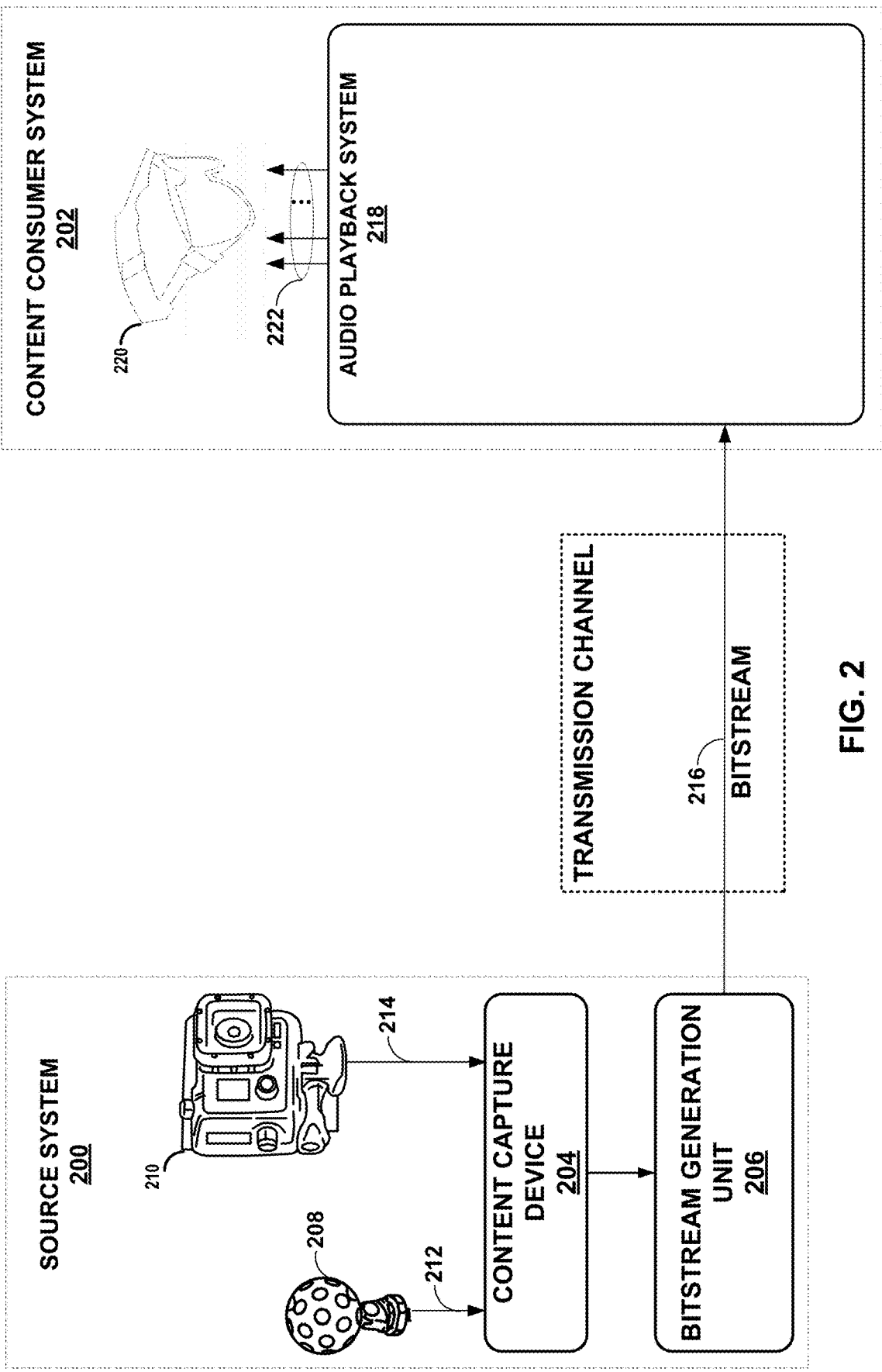
FIG. 2 is a diagram illustrating a system that may perform various aspects of the techniques described in this disclosure.

FIG. 2 is a diagram illustrating a system 10 that may perform various aspects of the techniques described in this disclosure. As shown in the example of FIG. 2, the system 10 includes a source system 200 and a content consumer system 202. While described in the context of the source system 200 and the content consumer system 202, the techniques may be implemented in other contexts. Moreover, the source system 200 may represent any form of computing device capable of generating a bitstream compatible with the techniques of this disclosure. Likewise, the content consumer system 202 may represent any form of computing system capable of implementing the techniques of this disclosure.

The source system 200 may be operated by an entertainment company or other entity that may generate multichannel audio content for consumption by operators of content consumer devices, such as the content consumer system 202. In many VR scenarios, the source system 200 generates audio content in conjunction with video content. In the example of FIG. 2, the source system 200 includes a content capture device 204, a bitstream generation unit 206, a microphone 208, and a camera 210.

The content capture device 204 may be configured to interface or otherwise communicate with a microphone 208. The microphone 208 may represent an Eigenmike® or other type of 3D audio microphone capable of capturing and representing the soundfield as HOA coefficients 11. The content capture device 204 may, in some examples, include an integrated microphone 208 that is integrated into the housing of the content capture device 204. In some examples, the content capture device 204 may interface wirelessly or via a wired connection with the microphone 208.

The microphone 208 generates audio data 212. In some examples, the audio data is scene-based audio data (e.g., HOA coefficients), channel-based audio data, object-based audio data, or another type of audio data. In other examples, the content capture device 204 may process the audio data 212 after receiving the audio data 212 via some type of storage (e.g., removable storage). Various combinations of the content capture device 204 and the microphone 208 are possible, where a few examples of such combinations are discussed above for purposes of explanation. The camera 210 may be configured to capture video data 214 and provide the captured raw video data 214 to the content capture device 204.

The content capture device 204 may also be configured to interface or otherwise communicate with the bitstream generation unit 206. The bitstream generation unit 206 may include any type of hardware device capable of interfacing with the content capture device 204. The bitstream generation unit 206 may use the audio data 212 to generate a bitstream 216 that includes one or more representations of a soundfield defined by the audio data 212. In some examples, the bitstream 216 may also include a representation of the video data 214.

Bitstream generation unit 206 may generate the representation of the audio data 212 in various ways. For instance, bitstream generation unit 206 may represent the audio data 212 in one or more of a scene-based audio format, a channel-based audio format, and/or an object-based audio format.

In some examples where the bitstream generation unit 206 represents the audio data in a scene-based audio format, the bitstream generation unit 206 uses a coding scheme for ambisonic representations of a soundfield, referred to as Mixed Order Ambisonics (MOA). To generate a particular MOA representation of the soundfield, the bitstream generation unit 206 may generate a partial subset of a full set of HOA coefficients. For instance, each MOA representation generated by the bitstream generation unit 206 may provide precision with respect to some areas of the soundfield, but less precision in other areas. In one example, an MOA representation of the soundfield may include eight (8) uncompressed HOA coefficients of the HOA coefficients, while the third order HOA representation of the same soundfield may include sixteen (16) uncompressed HOA coefficients of the HOA coefficients. As such, each MOA representation of the soundfield that is generated as a partial subset of the HOA coefficients may be less storage-intensive and less bandwidth intensive (if and when transmitted as part of the bitstream 216 over the illustrated transmission channel) than the corresponding third order HOA representation of the same soundfield generated from the HOA coefficients.

The content capture device 204 may, in some examples, be configured to wirelessly communicate with the bitstream generation unit 206. In some examples, the content capture device 204 may communicate, via one or both of a wireless connection or a wired connection, with the bitstream generation unit 206. Via the connection between the content capture device 204 and the bitstream generation unit 206, the content capture device 204 may provide content in various forms of content, which, for purposes of discussion, are described herein as being portions of the HOA coefficients 11.

In some examples, the content capture device 204 may leverage various aspects of the bitstream generation unit 206 (in terms of hardware or software capabilities of the bitstream generation unit 206). For example, the bitstream generation unit 206 may include dedicated hardware configured to (or specialized software that when executed causes one or more processors to) perform psychoacoustic audio encoding (such as a unified speech and audio coder denoted as "USAC" set forth by the Motion Picture Experts Group (MPEG) or the MPEG-H 3D audio coding standard). The content capture device 204 may not include the psychoacoustic audio encoder dedicated hardware or specialized software and instead provide audio aspects of the audio content 212 (which is another way of referring to the audio data 212) in a non-psychoacoustic-audio-coded form. The bitstream generation unit 206 may assist in the capture of content 212 by, at least in part, performing psychoacoustic audio encoding with respect to the audio aspects of the audio content 212.

The bitstream generation unit 206 may also assist in content capture and transmission by generating one or more bitstreams based, at least in part, on the audio content (e.g., MOA representations and/or third order HOA representations) generated from the audio data 212. The bitstream 216 may comprise a compressed version of the audio data 212 (and/or the partial subsets thereof used to form MOA representations of the soundfield) and any other different types of content (such as a compressed version of video data, image data, and/or text data). The bitstream generation unit 206 may generate the bitstream 216 for transmission, as one example, across a transmission channel, which may be a wired or wireless channel, a data storage device, or the like. The bitstream 216 may represent an encoded version of the audio data 212 (and/or the partial subsets thereof used to form MOA representations of the soundfield) and may include a primary bitstream and another side bitstream, which may be referred to as side channel information.

Figure 3:
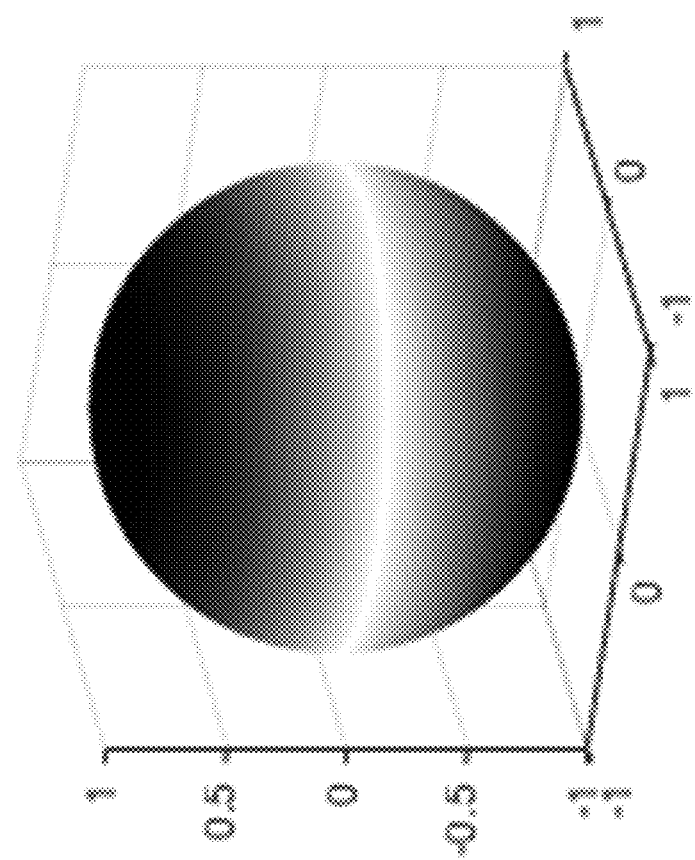
FIG. 3 is a diagram illustrating aspects of non-uniform spatial resolution distributions of a mixed order ambisonic representation of a soundfield.

FIG. 3 is a diagram illustrating aspects of non-uniform spatial resolution distributions of an MOA representation of a soundfield. Whereas a full spherical HOA has a uniformly high spatial resolution in all directions, an MOA representation of the same soundfield has a variable spatial resolution. In many cases, as in the example of FIG. 3, an MOA representation of a soundfield includes high resolution spatial audio data in the horizontal-only region, and includes lower resolution spatial audio data in the remaining regions of the soundfield. In the example illustrated in FIG. 3, the MOA representation of the soundfield includes a third order representation of the horizontal region (called out by a white band), and first order representations of all other regions (shown by the dark shaded-in portions). That is, according to the MOA representation of FIG. 3, as soon as a sound source leaves the equator of the soundfield, the sharpness and area of high quality reconstruction degrades rapidly with respect to audio objects emanating from the sound source.

Figure 4:
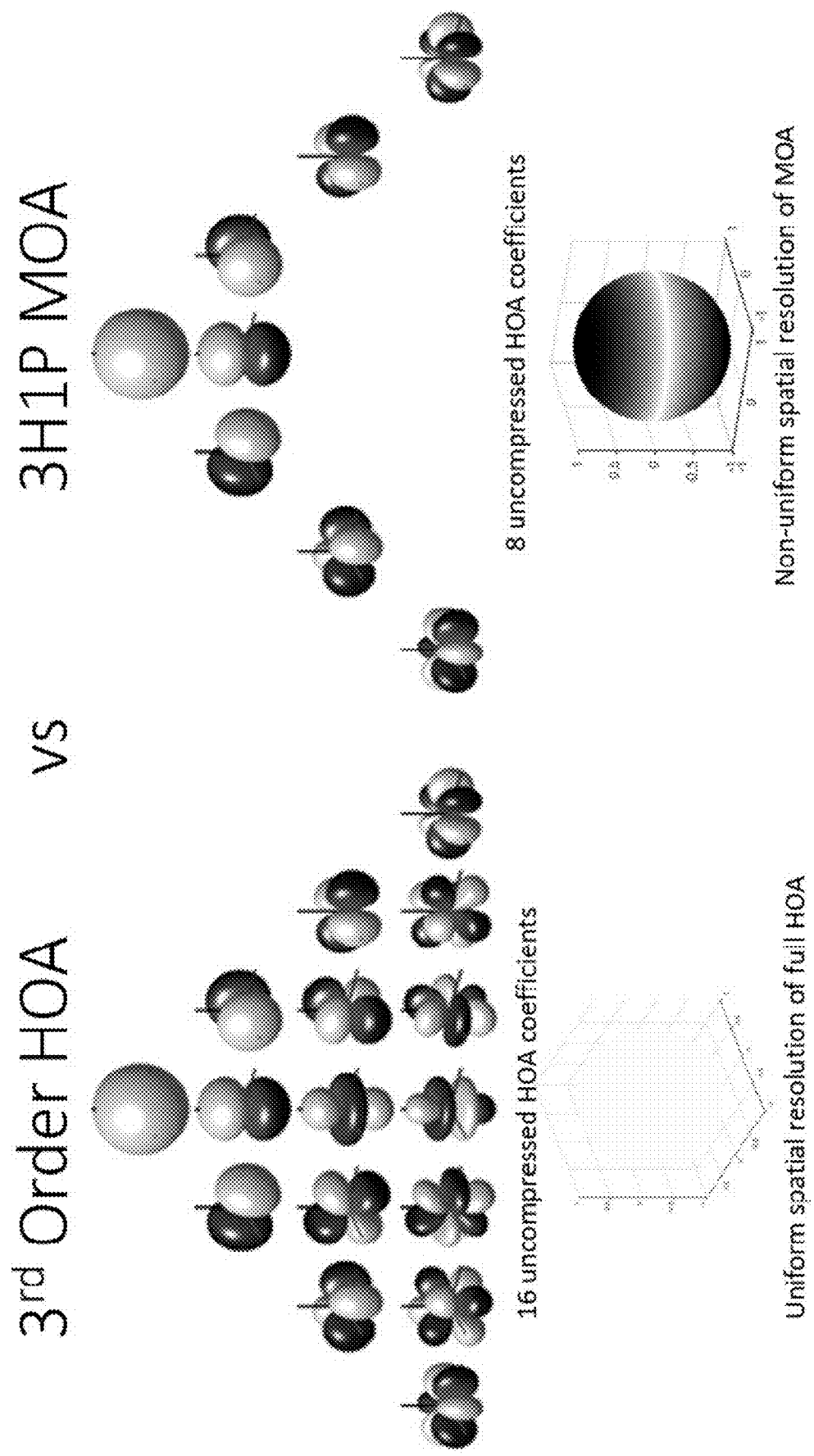
FIG. 4 is a diagram illustrating differences between a full third order HOA representation of a soundfield and a mixed order ambisonic representation of the same soundfield in which the horizontal region has a higher spatial resolution than the remaining regions.

FIG. 4 is a diagram illustrating differences between a full third order HOA representation of a soundfield and an MOA representation of the same soundfield in which the horizontal region has a higher spatial resolution than the remaining regions. As shown in FIG. 4, the full third order HOA representation includes sixteen (16) uncompressed HOA coefficients to represent the soundfield. The uniform spatial resolution of the full HOA representation is shown by the entire 3-axis plot being white (or appearing blank) with respect to the full third order HOA representation.

In contrast, the MOA representation includes eight (8) uncompressed HOA coefficients (or coefficient channels) with respect to the same soundfield. Moreover, in contrast to the uniform spatial resolution exhibited by the full third order HOA representation, the MOA representation shows a non-uniform spatial resolution in which the high spatial resolution occurs along the equator of the 3D soundfield, while the remaining regions of the soundfield are represented at a lower spatial resolution. The MOA representation illustrated in FIG. 4 is described as being a "3H1P" MOA representation, which indicates that the MOA representation includes a third order representation of the horizontal region and a first order representation of the remaining regions of the soundfield.

Although described with respect to captured content 212/214, various aspects of the techniques described in this disclosure may apply to generated or rendered content, such as is common in video games where the audio data 212 is retrieved from memory and/or storage rather than captured, and the video data 214 is generated programmatically by hardware, such as a graphics processing unit (GPU). In instances where the source system 200 obtains the content 212/214 rather than wholly capture the content 212/214, the source system 200 may represent a computer (e.g., a video game system, a laptop computer, a desktop computer, etc.) configured to generate the audio data 212 and the video data 214.

In any event, the content consumer system 202 may be operated by an individual, and may represent a VR client device in many examples. The content consumer system 202 may include an audio playback system 218 and a headset 220. Audio playback system 218 may refer to any form of audio playback system capable of rendering SHC (whether in form of third order HOA representations and/or MOA representations) or other scene-based audio data for playback as multi-channel audio content.

While shown in FIG. 2 as being directly transmitted to the content consumer system 202, the source system 200 may output the bitstream 216 to an intermediate device positioned between the source system 200 and the content consumer system 202. The intermediate device may store the bitstream 216 for later delivery to the content consumer system 202, which may request the bitstream. The intermediate device may comprise a file server, a web server, a desktop computer, a laptop computer, a tablet computer, a mobile phone, a smart phone, or any other device capable of storing the bitstream 216 for later retrieval by an audio decoder. The intermediate device may reside in a content delivery network capable of streaming the bitstream 216 (and possibly in conjunction with transmitting a corresponding video data bitstream) to subscribers, such as the content consumer system 202, requesting the bitstream 216.

Alternatively, the source system 200 may store the bitstream 216 to a storage medium, such as a compact disc, a digital video disc, a high definition video disc or other storage media, most of which are capable of being read by a computer and therefore may be referred to as computer-readable storage media or non-transitory computer-readable storage media. In this context, the transmission channel may refer to the channels by which content stored to the mediums are transmitted (and may include retail stores and other store-based delivery mechanism). In any event, the techniques of this disclosure should not therefore be limited in this respect to the example of FIG. 2.

As noted above, the content consumer system 202 includes the audio playback system 218. The audio playback system 218 may represent any audio playback system capable of playing back multi-channel audio data. The audio playback system 218 may include a number of different renderers. The renderers may each provide for a different form of rendering, where the different forms of rendering may include one or more of the various ways of performing vector-base amplitude panning (VBAP), and/or one or more of the various ways of performing soundfield synthesis. As used herein, "A and/or B" means "A or B", or both "A and B".

The audio playback system 218 may decode scene-based audio data, object-based audio data, channel-based audio data from the bitstream 216. As described in greater detail elsewhere in this disclosure, the audio playback system 218 may render the audio data decoded from the bitstream 216 into output speaker feeds 222. The speaker feeds 222 may drive one or more speakers included in headset 220 (which are not shown in the example of FIG. 2 for ease of illustration purposes). In some examples, the speaker feeds 222 include a left channel and a right channel for binaural playback. In examples where the scene-based audio data (e.g., as HOA coefficients) is included in the bitstream, Ambisonic representations of a soundfield may be normalized in a number of ways, including N3D, SN3D, FuMa, N2D, or SN2D.

In some examples, the content consumer system 202 receives the bitstream 216 from a streaming server. The streaming server may provide various types of streams, or combinations of streams, in response to such requests from streaming clients. For instance, the streaming server may also provide full-order HOA streaming as an option if requested by the streaming client (e.g., executing on the audio playback system 218). In other examples, the streaming server may provide one or more of object-based representations of the soundfield, higher order ambisonic representations of the soundfield, mixed order ambisonic representations of the soundfield, a combination of object-based representations of the soundfield with higher order ambisonic representations of the soundfield, a combination of object-based representations of the soundfield with mixed order ambisonic representations of the soundfield, or a combination of mixed order representations of the soundfield with higher order ambisonic representations of the soundfield.

The content consumer system 202 may represent a video game system or other computing device similar to the source system 200. Although shown as separate systems, the source system 200 and the content consumer system 202 may be a single system in some examples. For example, the source system 200 and the content consumer system 202 may both be implemented within a single video game system or other computing device. The single computing device may interface with a headset 220. In some instances, the headset 220 may house the single computing device (that implements both the source system 200 and the content consumer system 202) and there is no separate computing system.

Figure 5:
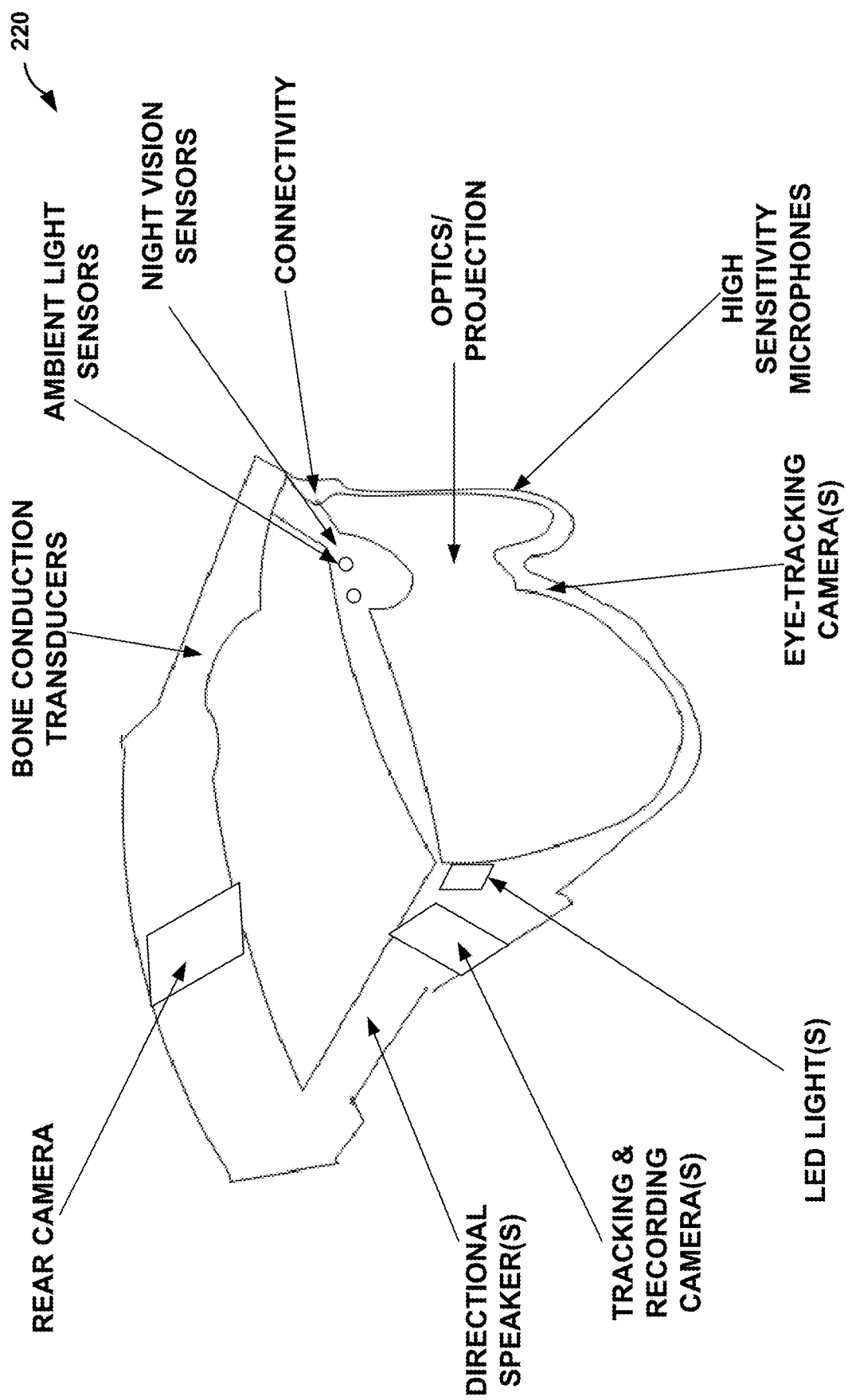
FIG. 5 is a diagram illustrating an example of a headset that one or more computer-mediated reality systems of this disclosure may use.

Regardless of the configuration of the source system 200 and the content consumer system 202, the content consumer system 202 may include the headset 220. FIG. 5 is a diagram illustrating an example of a headset 220 that one or more computer-mediated reality systems of this disclosure may use. In various examples, the headset 220 may represent a VR headset, an AR headset, an MR headset, an extended reality (XR) headset, or another type of headset for CMR. In some examples, the headset 220 does not have a visual component, but is outputs sound without a visual component. For example, the headset 220 may be a set of headphones.

As shown in the example of FIG. 5, the headset 220 includes a rear camera, one or more directional speakers, one or more tracking and/or recording cameras, and one or more light-emitting diode (LED) lights. In some examples, the LED light(s) may be referred to as "ultra bright" LED light(s). In addition, the headset 220 includes one or more eye-tracking cameras, high sensitivity audio microphones, and optics/projection hardware. The optics/projection hardware of the headset 220 may include durable semi-transparent display technology and hardware.

The headset 220 also includes connectivity hardware, which may represent one or more network interfaces that support multimode connectivity, such as 4G communications, 5G communications, etc. The headset 220 also includes ambient light sensors, and bone conduction transducers. In some instances, the headset 220 may also include one or more passive and/or active cameras with fisheye lenses and/or telephoto lenses. Various devices of this disclosure, such as the content consumer system 202 of FIG. 2 may use the steering angle of the headset 220 to select an audio representation of a soundfield to output via the directional speaker(s) of the headset 220, in accordance with various techniques of this disclosure. It will be appreciated that the headset 220 may exhibit a variety of different form factors.

As noted above, the content consumer system 202 also includes the headset 220. It will be understood that, in various implementations, the headset 220 may be included in, or externally coupled to, the content consumer system 202. As discussed above with respect to FIG. 5, the headset 220 includes display hardware configured to present the video data 214 and one or more speakers configured to reproduce, based on the audio data 212, the soundfield represented by the audio data 212. In some examples, the headset 220 may also include hardware that implements some or all of audio playback system 218. In some examples, a device separate from the headset 220, such as a smartphone or personal computer (including a video game system), includes hardware that implements some or all of audio playback system 218.

In some examples, a processor(s) of the headset 220 track a steering angle, using one or more angles associated with the head rotation information. In turn, the headset 220 may use the steering angle to determine how to output a CMR audio soundfield. The processor(s) of the headset 220 may also reproduce the soundfield via one or more speakers (e.g. the speakers of the headset 220). In some examples, the processor(s) of the headset 220 may use one or more sensors and/or cameras (e.g., the sensors and/or cameras of the headset 220) to capture images that indicate a gaze angle of a user wearing the headset 220. For instance, the processor(s) of the headset 220 may use the gaze angle to determine the steering angle. The processor(s) of the headset 220 may also represent an image sequence at a viewing angle based on the steering angle. For instance, the processor(s) of the headset 220 may output portions of the image sequence via the display hardware of the headset 220, at the particular viewing angle that suits the present steering angle of the headset 220.

The memory device of the headset 220 may also locally store various types of representations, or combinations thereof, in response to such a selection by the Audio Stream Selector executed by the processor(s) of the headset 220. For instance, as discussed above, the processor(s) of the headset 220 may also provide full-order HOA streaming as an option if selected by the Audio Stream Selector. In other examples, the processor(s) of the headset 220 may output, via the speaker hardware of the headset 220, one or more of object-based representations of the soundfield, higher order ambisonic representations of the soundfield, mixed order ambisonic representations of the soundfield, a combination of object-based representations of the soundfield with higher order ambisonic representations of the soundfield, a combination of object-based representations of the soundfield with mixed order ambisonic representations of the soundfield, or a combination of mixed order representations of the soundfield with higher order ambisonic representations of the soundfield. In some examples, one or more of the soundfield representations stored to the memory device of the headset 220 may include at least one high-resolution region and at least one lower-resolution region, and wherein the selected presentation based on the steering angle provides a greater spatial precision with respect to the at least one high-resolution region and a lesser spatial precision with respect to the lower-resolution region.

In some examples, the headset 220 may include one or more batteries that provide electrical energy to components of the headset 220.

Figure 6:
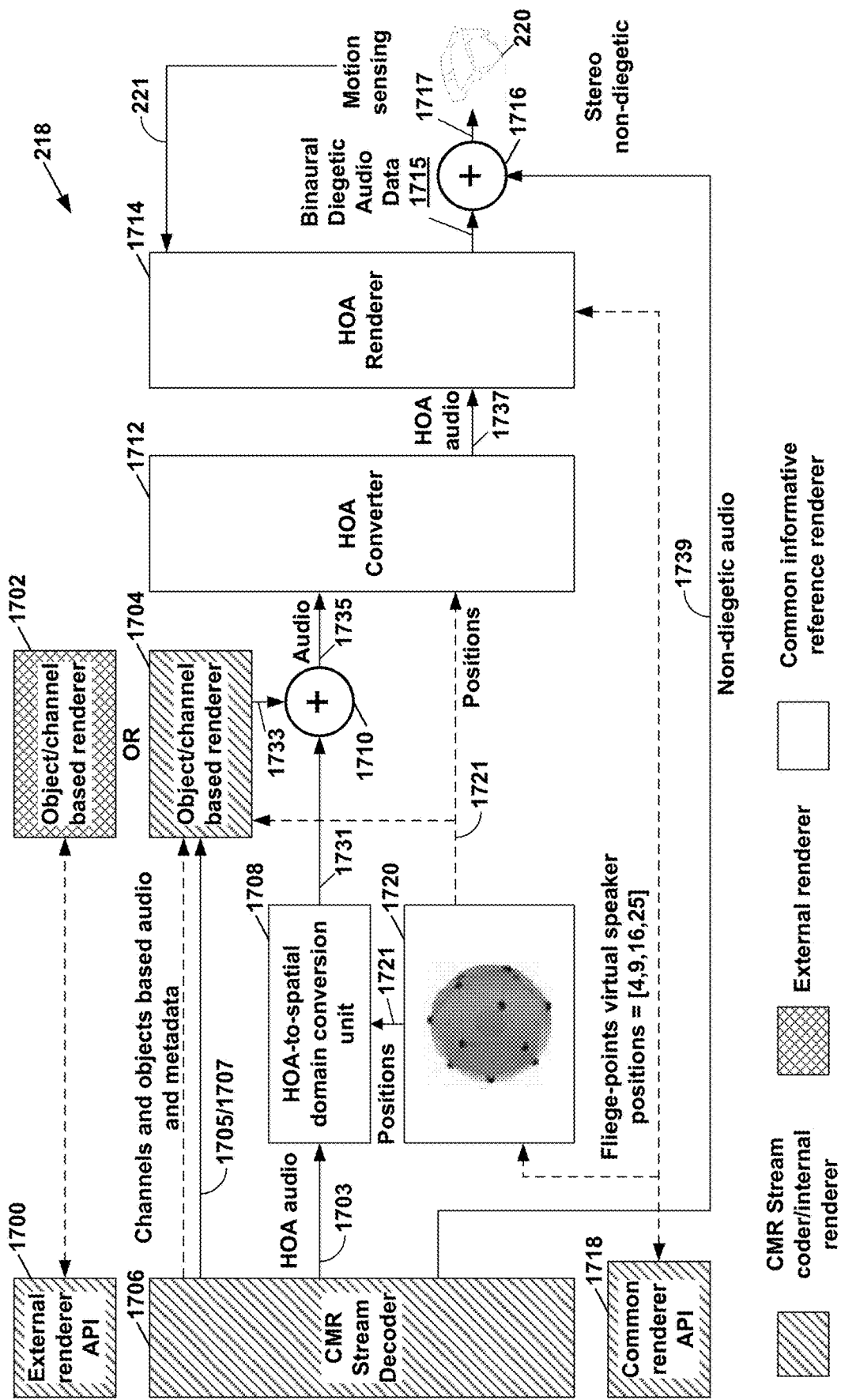
FIG. 6 is a block diagram illustrating an example implementation of an audio playback system that uses a common informative reference renderer, in accordance with a technique of this disclosure.

FIG. 6 is a block diagram illustrating an example implementation of the audio playback system 218 that uses a common informative reference renderer (CIRR), in accordance with various aspects of the techniques described in this disclosure. In the example of FIG. 6, the audio playback system 218 includes an external renderer application programming interface (API) 1700, an object/channel-based external renderer 1702, an object/channel-based internal renderer 1704, a CMR stream decoder 1706, an HOA-to-spatial domain conversion unit 1708, a mixing unit 1710, an HOA converter 1712, an HOA renderer 1714, a mixing unit 1716, a common renderer API 1718, and a virtual speaker location unit 1720.

The CMR stream decoder 1706 receives and decodes a bitstream, such as bitstream 216 (shown in the example of FIG. 2). The bitstream 216 may include a CMR stream (which may be referred to as the "CMR stream 216"). By decoding the CMR stream 216, the CMR stream decoder 1706 may generate one or more streams of non-diegetic audio data, one or more streams of object-based audio data, channel-based audio data and associated metadata, and/or HOA audio data or other scene-based audio data.

When the audio playback system 218 uses the external renderer 1702, the CMR stream decoder 1706 interfaces with the external renderer 1702 through the external renderer application programming interface (API) 1700. The external renderer API 1700 may represent an interface configured to provide configuration data or metadata to the external renderer 1702 and/or to receive configuration data or metadata from the external renderer 1702. Thus, channel-based audio data, object-based audio data and/or scene-based audio are sent from the CMR stream decoder 1706 to the external renderer 1604, along with the appropriate metadata and configuration information.

The external renderer 1702 (which may also be referred to as an "object/channel-based renderer 1702") uses the one or more streams of channel-based audio data, object-based audio data and associated metadata, and/or HOA audio data or other scene-based audio data to generate binaural diegetic audio data. The mixing unit 1716 mixes the binaural diegetic audio data with the one or more streams of non-diegetic audio data to generate mixed binaural audio data 1717. Speakers in the headset 220 may generate sound based on the mixed binaural audio data generated by the mixing unit 1606.

In instances where the CMR stream decoder 1706 provides channel-based audio data 1705 and/or object-based audio data 1707 (which may include associated metadata) to the external renderer 1702 via the external renderer API 1700, the external renderer 1702 may render channel-based audio data that corresponds to the speaker layout of headset 220, e.g., binaural audio data 1717, that is then transformed to accommodate motion sensing data 221. In other words, the headset 220 may perform further rendering to transform the binaural audio data 1717 in a manner that accounts for changing focal steering represented by motion sensing data 221.

Given that the headset 220 may be processing limited (e.g., featuring a processor having less processing capacity than the audio playback system 218) and/or limited by being energy limited (e.g., powered by a limited power source, such as a battery), the headset 220 may not have excessive processing and/or power capabilities to fully transform the binaural audio data 1717 in sufficient time to maintain coherence with the presented video data. In addition, transforming channel-based binaural audio data 1717 (which may have a left channel and a right channel) may involve significant mathematical computations that are difficult to perform in real-time by power-limited and/or energy-limited resources, further increasing the lack of coherence between the binaural audio data 1717 and the video data 214.

Such lack of coherence may introduce audio artifacts that reduce immersion in the CMR experience. Moreover, the significant processing may increase power consumption, memory bandwidth consumption, and associated memory consumption, which may result in limited time (due to limited power supplies, such as batteries) during which the headset 220 may support playback of the binaural audio data 1717 and the video data 214. The possible intensive processing and limited play duration may frustrate the user of the headset 220 in terms of overall experience as the audio artifacts may distort immersion, cause nausea, or otherwise disrupt the overall experience, possibly preventing adoption of CMR.

In accordance with various aspects of the techniques described in this disclosure, the audio playback system 218 may provide a scalable unified audio rendering that reduces processing complexity while accommodating all of the various different audio format types, such as channel-based audio data, object-based audio data, and/or scene-based audio data. The audio playback system 218 may support scalable audio rendering as any number of channels and/or objects may be rendered without increasing processing complexity contrary to rendering performed by the external renderer 1702. Further, the audio playback system 218 may support unified audio rendering by transforming object-based audio data and/or channel-based audio data into scene-based audio data, thereby potentially unifying all of the various audio format types.

As such, various aspects of the techniques may improve operation of the audio playback system 218 itself, as the audio playback system 218 may reduce processing cycles when rendering the binaural audio data 1717 from channel-based audio data 1705 and/or object-based audio data 1707 as well as scene-based audio data 1703 (where one such example is shown as HOA audio data 1703). As a result of more efficient processing during rendering and due to the unification, the audio playback system 218 may reduce power, memory bandwidth, and memory storage space consumption, thereby potentially enabling the audio playback system 218 to operate for longer durations on a fixed capacity power source (such as a battery).

In operation, the audio playback system 218 may receive a bitstream 216 that includes one or more different types of audio data (or, in other words, audio data that conforms to one or more different audio formats). For example, the bitstream 216 may include compressed representations of the channel-based audio data 1705, the object-based audio data 1707, and/or the scene-based audio data 1703.

The CMR stream decoder 1706 may represent an example of an audio decoder configured to decode, from the bitstream 216, first audio data for a time frame (meaning for a distinct period of time, such as a frame having a defined number of audio samples), and second audio data for the same time frame. The first audio data may refer to any one of the scene-based audio data 1703, the channel-based audio data 1705, or the object-based audio data 1707. The second audio data may also refer to any one of the scene-based audio data 1703, the channel-based audio data 1705, or the object-based audio data 1707.

Unless explicitly noted, it is assumed for purposes of illustration that the scene-based audio data 1703 represents the first audio data, while the channel-based audio data 1705 represents the second audio data. However, in some examples, various other types of the audio data 1703-1707 may represent the first audio data, while various other types of the audio data 1703-1707 may represent the second audio data.

As further shown in the example of FIG. 6, the audio playback device 218 may include the object/channel based renderer 1704, the HOA-to-spatial domain conversion unit 1708, a mixing unit 1710, an HOA converter 1712, an HOA renderer 1712, a mixing unit 1716, a common renderer API 1718, and a virtual speaker location unit 1720. The CMR stream decoder 1706 may output the scene-based audio data 1703 to an HOA-to-spatial domain conversion unit 1708. The CMR stream decoder 1706 may also output the channel-based audio data 1705 to the object/channel-based renderer 1704.

The HOA-to-spatial domain conversion unit 1708 may represent a unit configured to render the scene-based audio data 1703 into spatial domain audio data for playback by virtual speakers at a set of virtual speaker locations (which are shown as positions 1721, and may also be referred to as "virtual speaker locations 1721"). The HOA-to-spatial domain conversion unit 1708 may store, in the case of the HOA audio data 1703, one or more different spherical basis functions having different orders and sub-orders. The HOA-to-spatial domain conversion unit 1708 may apply various equations similar to those listed above to render, based on the spherical basis functions, the HOA audio data 1703 to spatial domain audio data 1731.

That is, the HOA-to-spatial domain conversion unit 1708 may transform the HOA audio data 1703 from the spherical harmonic domain to the spatial domain to obtain channel-based audio data 1731 (which is another way to refer to the spatial domain audio data 1731). The channel-based audio data 1731 may include a channel for each of the virtual speakers located at a respective one of the set of virtual speaker locations 1721. The HOA-to-spatial domain conversion unit 1708 may output the spatial domain audio data 1731 to the mixing unit 1710.

The object/channel based renderer 1704 may represent a unit configured to render the channel-based audio data 1705 and/or the object-based audio data 1707 for playback by virtual speakers at a set of virtual speaker locations 1721. The object/channel based renderer 1704 may remap the channel-based audio data 1705 from the current location for each channel to the set of virtual speaker locations. In some examples, the object-channel based renderer 1705 may perform vector-based amplitude panning to remap the channel-based audio data 1705 from the current location for each channel to he set of virtual speaker locations. In this respect, the object/channel based renderer 1704 may render the channel-based audio data 1705 into spatial domain audio data 1733 for playback by virtual speakers at a set of virtual speaker locations.

The virtual speaker location unit 1720 may represent a unit configured to determine a set of virtual speaker locations (e.g., Fliege points, which may represent one example of a set of virtual speaker locations uniformly distributed about a sphere in which a head of a listener is positioned at a center of the sphere). In some examples, either 4, 8, 16 or 25 virtual speaker locations (or, in other words, positions) are supported. In accordance with various techniques of this disclosure, the virtual speaker location unit 1720 may determine the set of virtual speaker locations based on headset capability information that indicates one or more capabilities of the headset 220. For example, higher orders and larger numbers of HOA coefficients require more processing operations to render in the same amount of output time. Accordingly, processors with less processing power, or those processors with more limited battery power, may not be able to, or may be configured to avoid, processing HOA coefficients having orders above particular thresholds.

For example, a processor of the headset 220 for rendering HOA coefficients may be configured to render HOA coefficients up to $3^{rd}$ order HOA coefficients, but not $4^{th}$ order HOA coefficients or higher orders of HOA coefficients. In general, lower numbers of virtual speaker locations are correlated with lower orders of HOA coefficients. Hence, the virtual speaker location unit 1720 may determine the virtual speaker locations based on information regarding a processing capability of the headset 220. For example, the virtual speaker location unit 1720 may determine a threshold based on a processing capability of the headset 220 and determine the virtual speaker locations such that the number of virtual speaker locations does not exceed the threshold.

In some examples, the virtual speaker location unit 1720 determines the set of virtual speaker locations based, at least in part, on information regarding the scene-based audio data 1703 decoded from the bitstream 216. For example, the virtual speaker location unit 1720 may determine the set of virtual speaker locations based on the order of the HOA coefficients in the scene-based audio data 1703 decoded from the bitstream 216.

In some examples, the virtual speaker location unit 1720 is configured to use a lookup table that maps types of processor (or types of headsets) to predetermined sets of virtual speaker locations. In some examples, the virtual speaker location unit 1720 is configured to determine the set of virtual speaker locations 1721 based on other factors.

In some examples, the processing capabilities of the headset 220 may change dynamically over time. For example, the processing capabilities of the headset 220 may change based on other processing loads on the processor(s) of the headset 220, based on available bandwidth for transmission of the HOA audio data to the headset 220, and/or based on other factors. Hence, in some such examples, the virtual speaker location unit 1720 may dynamically change which virtual speaker locations are used over time. In this respect, the virtual speaker location unit 1720 may obtain and output virtual speaker locations 1721 representative of virtual speakers at a set of virtual speaker locations to HOA-to-spatial domain conversion unit 1708, object/channel based renderer 1704 and HOA renderer 1714.

As described above, the object/channel-based external renderer 1702 and/or the object/channel-based internal renderer 1704 renders, based on the virtual speaker locations 1721 determined by the virtual speaker location unit 1720, the channel- and/or object-based audio data 1705/1707 for output on virtual speakers at the determined virtual speaker locations 1721. The object/channel-based external renderer 1702 and/or the object/channel-based internal renderer 1704 may use VBAP to render the object- or channel-based audio data for playback by the virtual speakers at the determined virtual speaker locations 1721. The object/channel-based external renderer 1702 and/or the object/channel-based internal renderer 1704 may generate one spatial domain signal (e.g., a channel) for each of the determined virtual speaker locations. As such, this first rendering step may be performed either through an Internal Renderer or an External Renderer.

In examples where the object/channel-based external renderer 1702 is used, the external renderer API 1700 may be used (e.g., by CMR stream decoder 1706) to send and receive information from the object/channel-based external renderer 1702. The common renderer API 1718 may be used (e.g., by CMR stream decoder 1706) to send and receive information from the common informative reference renderer components.

The HOA-to-spatial domain conversion unit 1708 converts, based on the virtual speaker locations 1721 determined by the virtual speaker location unit 1720, HOA audio data 1703 to a spatial equivalent domain representation. For example, the HOA-to-spatial domain conversion unit 1708 may apply to the HOA audio data 1703 a rendering matrix corresponding to the determined virtual speaker locations 1721. The HOA-to-spatial domain conversion unit 1708 may generate one spatial domain signal for each of the determined virtual speaker locations.

The equivalent spatial domain representation of a $N^{th}$ order soundfield representation c(t) is obtained by rendering c(t) to O virtual loudspeaker signals $w_j(t)$, $1 \le j \le O$, with $O=(N+1)^2$. The respective virtual loudspeaker positions are expressed by means of a spherical coordinate system, where each position lies on the unit sphere, i.e., a radius of 1. Hence, the positions can be equivalently expressed by order-dependent directions $\Omega_j^{(N)}=(\theta_j^{(N)},\phi_j^{(N)})$, $1 \le j \le O$, where $\theta_j^{(N)}$ and $\phi_j^{(N)}$ denote the inclinations and azimuths, respectively.

The rendering of c(t) into the equivalent spatial domain can be formulated as a matrix multiplication $$w(t)=(\Psi^{(N,N)})^{-1} \cdot c(t),$$

where $(\bullet)^{-1}$ denotes the inversion.
The matrix $\Psi^{(N,N)}$ of order N with respect to the order-dependent directions $\Omega_j^{(N)}$ is defined by $$\Psi^{(N,N)}:=[S_1^{(N)} S_2^{(N)} \ldots S_O^{(N)}]$$

with $$S_j^{(N)}:=[S_0^0(\Omega_j^{(N)}) S_{-1}^{-1}(\Omega_j^{(N)}) S_{-1}^{0}(\Omega_j^{(N)}) S_{-1}^{1}(\Omega_j^{(N)}) S_{-2}^{-2}(\Omega_j^{(N)}) \ldots S_N^N(\Omega_j^{(N)})]^T$$

Where $S_n^m(\bullet)$ represents the real valued spherical harmonics of the order n and degree m.
The matrix $\Psi^{(N,N)}$ is invertible so that the HOA representation c(t) can be converted back from the equivalent spatial domain by $$C(t)=\Psi^{(N,N)} \cdot w(t).$$

An HOA soundfield H may be converted into N-channel audio data $\tilde{\Gamma}$ in accordance with the following equation, where D is a rendering matrix determined based on a loudspeaker configuration (e.g., the determined virtual speaker locations) of the N-channel audio data.

$$\tilde{\Gamma}=HD^T$$

In the equation above $D^T$ indicates the transpose of the rendering matrix D. Matrices, such as rendering matrices, may be processed in various ways. For example, a matrix may be processed (e.g., stored, added, multiplied, retrieved, etc.) as rows, columns, vectors, or in other ways.

The mixing unit 1710 may represent a unit configured to mix the spatial domain audio data 1731 generated by the HOA-to-spatial domain conversion unit 1708 with corresponding spatial domain audio data 1733 generated by the object/channel-based external renderer 1702 or the object/channel-based internal renderer 1704. In this way, the mixing unit 1710 may output, to the HOA converter 1712, spatial domain audio data 1735 having a channel for each of the determined virtual speaker locations 1721.

Furthermore, in the example of FIG. 6, based on the determined virtual speaker locations 1721, the HOA converter 1712 may convert the spatial domain audio data 1735 output by the mixing unit 1710 to a scene-based audio domain (e.g., an HOA domain or, in other words, a spherical harmonic domain). The HOA converter 1712 may output a stream of scene-based audio data 1737. In this way, the audio playback system 218 may determine, based on data regarding capabilities of headset 220, a set of one or more virtual speaker locations 1721 and may generate, based on the set of virtual speaker locations 1721, the scene-based audio data 1737. In some examples, audio playback system 218 includes an interface configured to transmit, to the headset 220, the scene-based audio data 1737 and data indicating the set of virtual speaker locations 1721.

Thus, in some examples, the audio playback system 218 may perform at least one of: generating, based on the set of one or more virtual speaker locations and scene-based audio data decoded from a bitstream, first spatial domain audio data; and generating, based on the set of one or more virtual speaker locations and channel or object-based audio data decoded from the bitstream, second spatial domain audio data. In such examples, the audio playback system 218 may generate, based on at least one of the first spatial domain audio data and the second spatial domain audio data, third spatial domain audio data. Additionally, the audio playback system 218 may generate, based on at least one of the third spatial domain audio data, the scene-based audio data.

Furthermore, in one example, the audio playback system 218 may determine, based on data regarding capabilities of a headset, a set of one or more virtual speaker locations. In this example, the audio playback system 218 may decode first audio data from a bitstream, the first audio data being scene-based audio data. Additionally, the audio playback system 218 may decode second audio data from the bitstream, the second audio data being object-based or channel-based audio data. In this example, the audio playback system 218 may render the first audio data into first spatial domain audio data for playback on speakers at the set of virtual speaker locations. The audio playback system 218 may render the second audio data into the second spatial domain audio data for playback on the speakers at the set of virtual speaker locations. Additionally, the audio playback system 218 may generate third spatial domain audio data by mixing the first spatial domain audio data and the second spatial domain audio data. In this example, the audio playback system 218 may convert the third spatial domain audio data in a second scene-based audio data.

The HOA renderer 1714 may then apply a rendering matrix to the stream of scene-based audio data 1737 output by the HOA converter 1712. By applying the rendering matrix to the stream of scene-based audio data 1737, the HOA renderer 1714 may generate spatial domain binaural diegetic audio data 1715. In other words, the HOA renderer 1714 may determine, based on an orientation of the headset (e.g., as defined by motion sensing data 221), a rendering matrix and may generate spatial domain audio data 1717 by applying the rendering matrix to the scene-based audio data 1737.

In other words, the HOA renderer 1714 may represent a unit configured to transform the scene-based audio data 1737 from the spherical harmonic domain to the spatial domain to obtain channel-based audio data 1717. The HOA renderer 1714 may obtain a rendering matrix specific to the headset 220, or in some examples, derives the rendering matrix specific to the headset 220 from the headset capability information. The rendering matrix may be specific to the headset 220 in that the rendering matrix may account for the placement of speakers within the headset 220 or otherwise adapt the transform to better localize sounds given the capabilities of the headset 220.

The HOA renderer 1714 may adapt or otherwise configure the rendering matrix to account for movement as represented by the motion sensing data 221. That is, the HOA renderer 1714 may apply one or more transformations to the rendering matrix to adjust how the soundfield is represented by the resulting binaural diegetic audio data 1715. The transformations may rotate or otherwise adjust the soundfield to account for movement defined by the motion sensing data 221.

The mixing unit 1716 may mix the binaural diegetic audio data generated by the HOA renderer 1714 with non-diegetic audio data 1739 to generate mixed audio data in the spatial domain. The speakers of the headset 220 may reproduce the soundfield represented by the mixed audio data 1717. In this way, any Higher Order Ambisonics (HOA) content of the bitstream is converted into a Spatial Equivalent Domain Representation using the virtual speaker positions. All signals rendered at the virtual speaker positions are then mixed and converted into a HOA representation by the CIRR. Finally, the CIRR renders the binaural signals.

As mentioned above, the HOA renderer 1714 may apply a rendering matrix to the stream of scene-based audio data 1737 output by the HOA converter 1712. In some examples, the HOA renderer 1714 determines the rendering matrix based on an orientation of the headset 220 (e.g., a 2-dimensional or 3-dimensional spatial orientation of the headset 220). For example, the headset 220 may comprise one or more sensors. In this example, the headset 220 may use signals from the sensors to determine the orientation of the headset 220. In this example, the headset 220 may generate information indicating the orientation of the headset 220. The HOA renderer 1714 may, in this example, use the information indicating the orientation of the headset 220 to determine the rendering matrix. For instance, the HOA renderer 1714 may select the rendering matrix from a set of predetermined rendering matrices. In other examples, the HOA renderer 1714 or another component may use signals from the sensors of the headset 220 to determine the orientation of the headset 220.

In some examples, the components of the audio playback system 218 are distributed among multiple devices. For example, the HOA renderer 1714 may be implemented in the headset 220, while the remaining components of the audio playback system 218 shown in the example of FIG. 6 are implemented in another device (e.g., a smartphone, personal computer, or other type of computing device) communicatively coupled to the headset 220.

Distributing the components of the audio playback system 218 in this way may have several advantages. For instance, applying a rendering matrix to scene-based audio data 1737 is a relatively simple computation that requires relatively little electrical energy compared to the computations performed by other components of the audio playback system 218. Furthermore, time spent communicating information regarding the orientation of the headset 220 is reduced when the HOA renderer 1714 is included in the headset 220. Hence, the audio playback system 218 as a whole may be more responsive to changes of the orientation of the headset 220.

When the objects, channels and scene-base audio signals are mixed and converted into the HOA format, a low complexity sound-field rotation operation can be realized as close as possible to the binaural rendering point, potentially in a separate headset device (e.g., the headset 220), enabling low motion to sound latency and a fixed complexity for a given HOA order (regardless of the number of channels and objects). Other rendering steps, with potentially higher latency and computational demands, can be performed closer to the decoder operation and synchronized with the video (e.g. on a computer or mobile phone). These other rendering steps are performed by either the Internal or External renderer. Where necessary, devices implementing the CIRR can further reduce complexity by reducing the Ambisonics order on the rendering operation.

Thus, in summary, a technique of this disclosure may be implemented in one or more devices for rendering an audio stream (e.g., the headset 220, a smartphone, computer, or other device). The devices may include a memory, battery, CPU, etc. The devices may be configured to generate, based on the available hardware resources, a set of loudspeaker positions corresponding to an equivalent spatial domain representation for the desired rendering order. Additionally, the devices may receive a scene-based audio stream and convert the stream to the equivalent spatial domain representation for the desired rendering order.

Additionally, the devices may receive an object- and/or channel-based audio stream and convert the stream to the equivalent spatial domain representation for the desired rendering order. The devices may mix the equivalent spatial domain streams corresponding to the scene-based, object-based and channel-based audio streams to produce an equivalent spatial domain mixed stream. The devices may render the equivalent spatial domain mixed stream to a binaural or loudspeaker-based representation. In some examples, the desired rendering order is determined based on the order of the scene-based audio stream and/or metadata information from the object-based audio stream. In some examples, the equivalent spatial domain representation is reconfigured according to information from a motion sensor.

Figure 7:
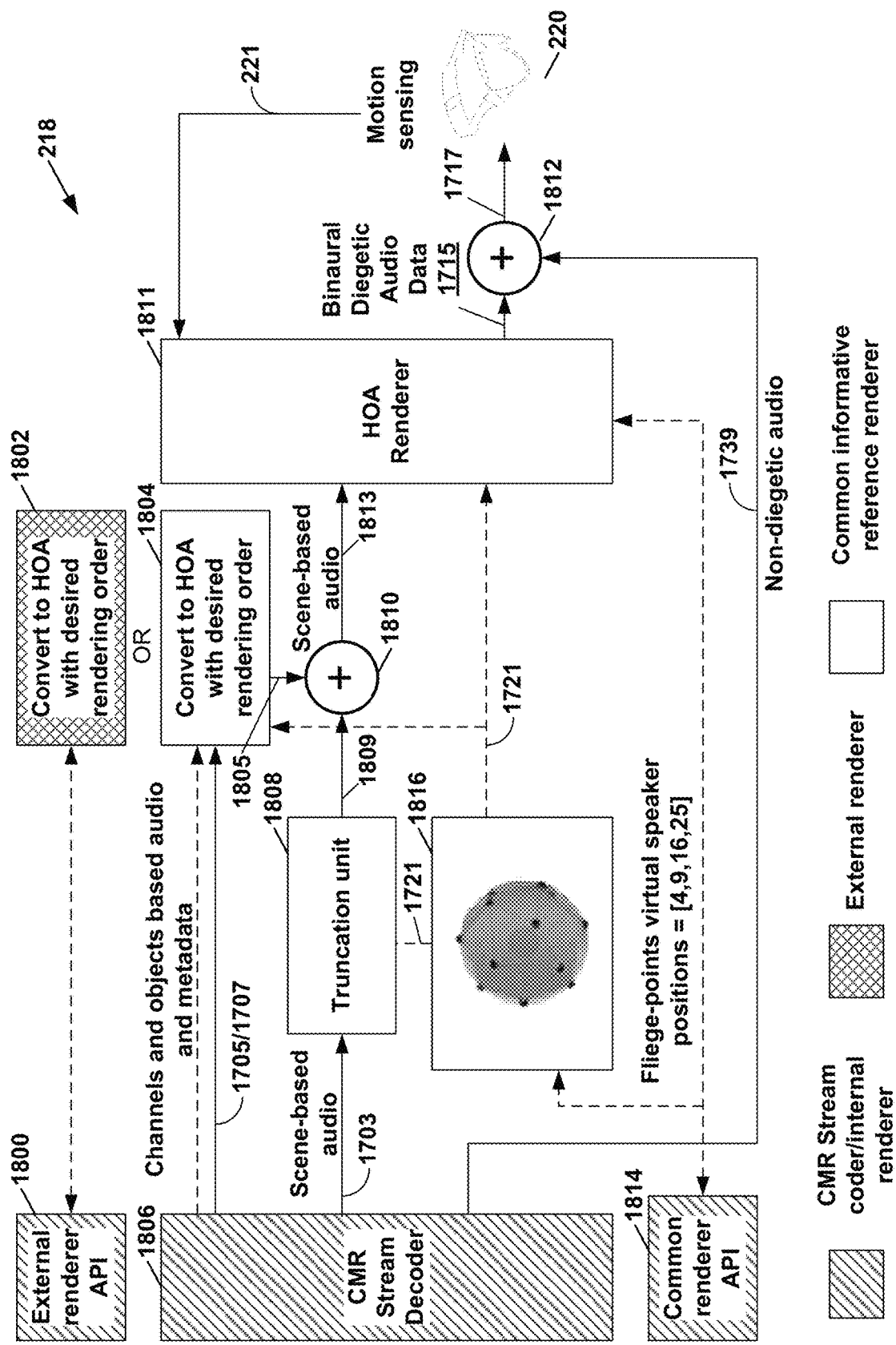
FIG. 7 is a block diagram illustrating an example implementation of an audio playback system that uses a common informative reference renderer, in accordance with a technique of this disclosure.

FIG. 7 is a block diagram illustrating an example implementation of the audio playback system 218 that uses a common informative reference renderer, in accordance with a technique of this disclosure. In the example of FIG. 7, the audio playback system 218 includes an external renderer API 1800, an object/channel-based external renderer 1802, an object/channel-based internal renderer 1804, a CMR stream decoder 1806, a truncation unit 1808, a mixing unit 1810, an HOA renderer 1811, a mixing unit 1812, a common renderer API 1814, and a virtual speaker location unit 1816.

The CMR stream decoder 1806 receives and decodes a bitstream, such as bitstream 216 (FIG. 2). In some examples, the bitstream 216 is a CMR stream that includes encoded audio data and encoded video data for use in CMR. In some examples, the bitstream 216 does not include encoded video data. By decoding the bitstream 216, the CMR stream decoder 1806 may generate one or more streams of non-diegetic audio data 1739, one or more streams of channel-based audio data 1705 and/or object-based audio data 1707 and associated metadata, and scene-based audio data (e.g., HOA data).

In the example of FIG. 7, the virtual speaker location unit 1816 determines a set of virtual speaker locations 1721 (e.g., Fliege points, which again may represent one example of locations uniformly distributed about a sphere in which a head of a listener is positioned at a center of the sphere). The virtual speaker location unit 1816 may determine the set of virtual speaker locations 1721 in the same manner as described elsewhere in this disclosure with respect to virtual speaker location unit 1720 (FIG. 6).

In the example of FIG. 7, the object/channel-based external renderer 1802 and/or the object/channel-based internal renderer 1804 renders, based on the virtual speaker locations 1721 determined by the virtual speaker location unit 1816, the object- or channel-based audio data 1705/1707 into a stream of scene-based audio data 1805 with a desired rendering order. In this context, "order" is in the sense of Higher-Order Ambisonics coefficients. In examples where the object/channel-based external renderer 1802 is used, the external renderer API 1800 may be used (e.g., by the CMR stream decoder 1806) to send and receive information from the object/channel-based external renderer 1802. The common renderer API 1814 may be used (e.g., by CMR stream decoder 1806) to send and receive information from the common informative reference renderer components.

In the manner described above, the audio playback system 218 may determine, based on data regarding capabilities of the headset 220, a set of one or more virtual speaker locations 1721. An object-based renderer (e.g., 1702, 1704, 1802, 1804) may then render, based on the set of virtual speaker locations 1721, first audio data into spatial domain audio data (FIG. 6) or scene-based audio data (FIG. 7), the first audio data being object-based audio data Truncation unit 1808 may represent a unit configured to truncate, based on the virtual speaker locations 1721 determined by the virtual speaker location unit 1816, the scene-based audio data 1703 output by the CMR stream decoder 1806. For instance, the truncation unit 1808 may reduce the order of HOA audio data 1703. For instance, truncation unit 1808 may convert $3^{rd}$-order HOA audio data 1703 to 3H1P MOA, as shown in the example of FIG. 4, outputting truncated scene-based audio data 1809. In another example, truncation unit 1808 may convert $4^{th}$ order HOA coefficients to $3^{rd}$ order HOA coefficients, or perform other like conversion to obtain the truncated scene-based audio data 1809. In some examples, based on the determined virtual speaker locations 1721, truncation unit 1808 does not perform any truncation.

The mixing unit 1810 may mix the scene-based audio data 1809 output by truncation unit 1808 with the scene-based audio data 1805 output by object/channel-based external renderer 1802 or the object/channel-based internal renderer 1804. For example, the mixing unit 1810 may add corresponding coefficients of the scene-based audio data 1809 output by truncation unit 1808 with the scene-based audio data 1805 output by object/channel-based external renderer 1802 or the object/channel-based internal renderer 1804.

The audio playback system 218 of FIG. 7 may perform at least one of: generating, based on the set of one or more virtual speaker locations and first preliminary scene-based audio data decoded from a bitstream, second preliminary scene-based audio data; and generating, based on the set of one or more virtual speaker locations and channel or object-based audio data decoded from the bitstream, third preliminary scene-based audio data. Furthermore, in such examples, the audio playback system 218 of FIG. 7 may generate, based on at least one of the second preliminary scene-based audio data and the third preliminary scene-based audio data, the final scene-based audio data.

In one example, the audio playback system 218 may determine, based on data regarding capabilities of the headset 220, a set of one or more virtual speaker locations 1721. In this example, the CMR stream decoder 1806 of the audio playback system 218 may decode first audio data from the bitstream 216, the first audio data being first scene-based audio data 1703. Additionally, in this example, the CMR stream decoder 1806 may also decode second audio data from the bitstream 216, the second audio data being object-based or channel-based audio data 1705/1707.

Furthermore, in this example, internal or external renderers 1802, 1804 of the audio playback system 218 may render, based on the virtual speaker locations 1721, the second audio data into second scene-based audio data 1805. In this example, the mixing unit 1810 of the audio playback system 218 may mix the scene-based audio data 1805 with the scene-based audio data 1709 to obtain mixed scene-based audio data 1813. In some instances, prior to the mixing, truncation unit 1808 may truncate the first scene-based audio data 1703 based on the virtual speaker locations 1721. The HOA renderer 1811 may apply a rendering matrix to convert the mixed scene-based audio data 1813 to binaural audio data 1715 in the manner described above with respect to the HOA renderer 1714 shown in the example of FIG. 6.

The HOA renderer 1811 may apply a rendering matrix to the mixed scene-based audio data 1813 output by the mixing unit 1810. By applying the rendering matrix to the stream of mixed scene-based audio data 1813, the HOA renderer 1811 may generate spatial domain binaural diegetic audio data. The mixing unit 1812 may mix the binaural diegetic audio data generated by the HOA renderer 1811 with non-diegetic audio data to generate mixed audio data in the spatial domain. The headset 220 may include speakers configured to reproduce a soundfield represented by the mixed audio data. The HOA renderer 1811 may operate in the same way as the HOA renderer 1714 of FIG. 6. Moreover, in some examples, the HOA renderer 1811 may be implemented in the headset 220 while one or more other components of the audio playback system 218 are implemented in another device, such as a smartphone or computer.

Thus, in some examples, a technique of this disclosure may be implemented in one or more devices for rendering an audio stream. The devices may include a memory, battery, CPU, etc. configured to generate, based on the available hardware resources, a set of loudspeaker positions corresponding to an equivalent spatial domain representation for the desired rendering order. The devices may receive a scene-based audio stream and truncate the stream to a scene-based audio representation with the desired rendering order. Furthermore, the devices may receive an object and/or channel-based audio stream and convert said stream to a scene-based audio representation with the desired rendering order.

Additionally, the devices may mix the scene-based audio representation with the desired rendering order streams, corresponding to the scene-based, object-based and channel-based audio streams, to produce a scene-based audio representation with the desired rendering order mixed stream. The devices may render the scene-based audio representation with the desired rendering order mixed stream to a binauralor loudspeaker-based representation. In some examples, the desired rendering order is determined based on the order of the scene-based audio stream and/or metadata information from the object-based audio streams. In some examples, the scene-based audio representation with the desired rendering order mixed stream representation is reconfigured according to information from a motion sensor.

Figure 8:
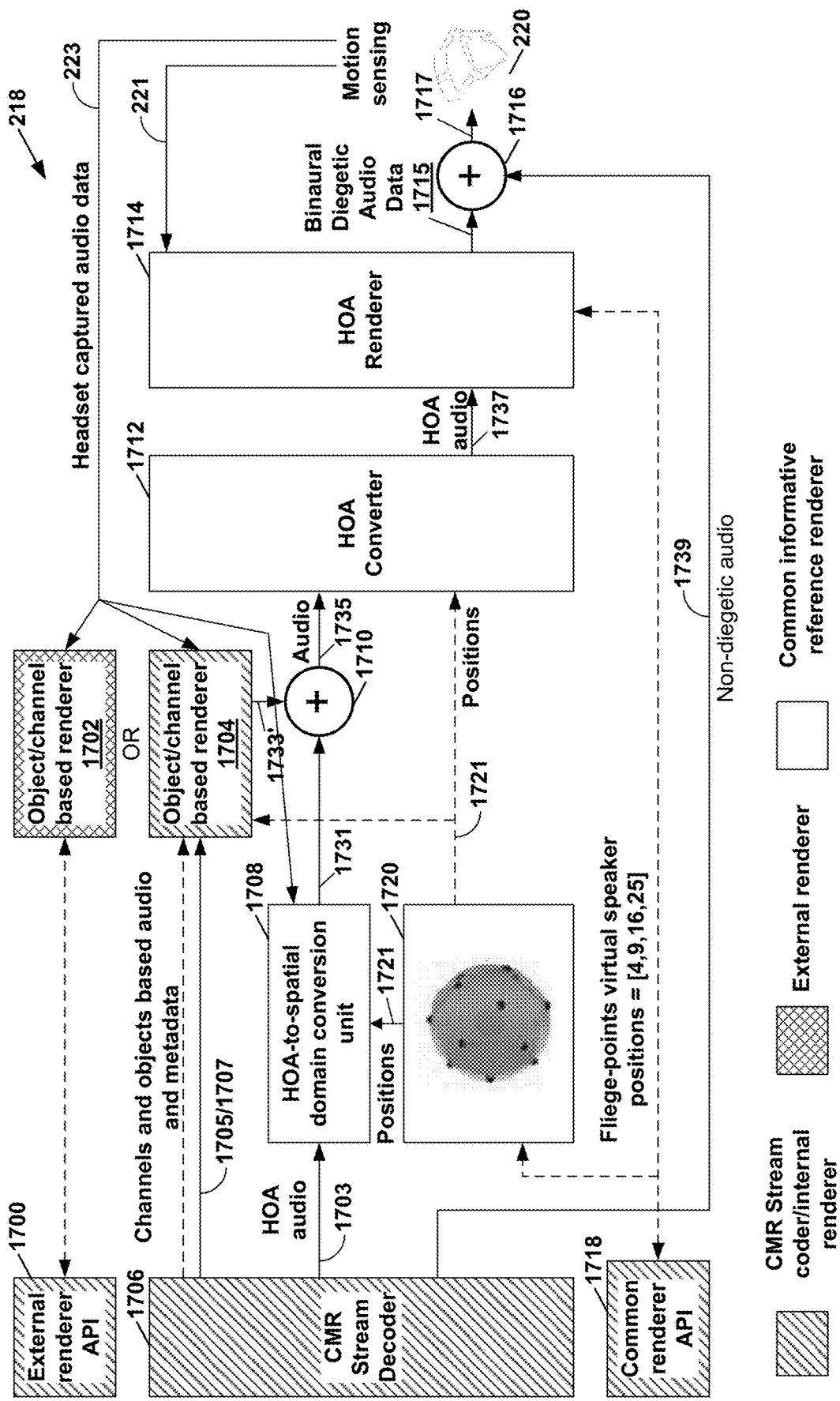
FIG. 8 is a block diagram illustrating an example implementation of an audio playback system that uses a common informative reference renderer that uses headset captured audio data for augmented reality, in accordance with a technique of this disclosure.

FIG. 8 is a block diagram illustrating an example implementation of the audio playback system 218 that uses a common informative reference renderer that uses headset captured audio data for augmented reality, in accordance with a technique of this disclosure. FIG. 8 is similar to FIG. 6, except that the headset 220 may include microphones that capture sound in an environment of a user of the headset 220. The headset 220 may generate headset captured audio data 223 based on signals from the microphones.

In some examples, the headset captured audio data 223 includes spatial domain audio data. In such examples, the object/channel-based external renderer 1702 or the object/channel-based internal renderer 1704 may generate, based on the determined set of virtual speaker locations 1721 and the headset captured audio data 223, modified spatial domain audio data 223' (e.g., using VBAP). The mixing unit 1710 may mix the modified spatial domain audio data 223' with spatial domain audio data 1733 generated by the object/channel-based external renderer 1702 or the object/channel-based internal renderer 1704 based on channel- or object-based audio data decoded from the bitstream and/or spatial domain audio data 1731 output by the HOA-to-spatial domain conversion unit 1708. The spatial domain audio data generated by the mixing unit 1710 may then be processed in the manner described with respect to FIG. 6 above.

In some examples, the headset captured audio data includes 223 scene-based audio data. In such examples, the HOA-to-spatial domain conversion unit 1708 may generate, based on the determined set of virtual speaker locations 1721 and the headset captured audio data 223, modified spatial domain audio data 223'. The mixing unit 1710 may mix the modified spatial domain audio data 223' with spatial domain audio data 1733 generated by the object/channel-based external renderer 1702 or the object/channel-based internal renderer 1704 based on channel- or object-based audio data decoded from the bitstream and/or spatial domain audio data 1731 output by the HOA-to-spatial domain conversion unit 1708 based on scene-based audio data 1703 decoded from the bitstream 216.

The spatial domain audio data generated by the mixing unit 1710 may then be processed in the manner described with respect to FIG. 8. For instance, the HOA converter 1712 may convert the audio data output by the mixing unit 1710 into scene-based audio data. Thus, in accordance with a technique of this disclosure, the audio playback system 218 may generate, based on headset-captured audio data 223 and data decoded from a bitstream 216, scene-based audio data, wherein the headset-captured audio data comprises audio data representing sounds detected by a computer-mediated reality (CMR) headset (e.g., the headset 220).

A similar example may be provided with respect to the object/channel-based external renderer 1802, the object/channel-based internal renderer 1804, and truncation unit 1808 of FIG. 7 receiving headset captured audio data.

Figure 9:
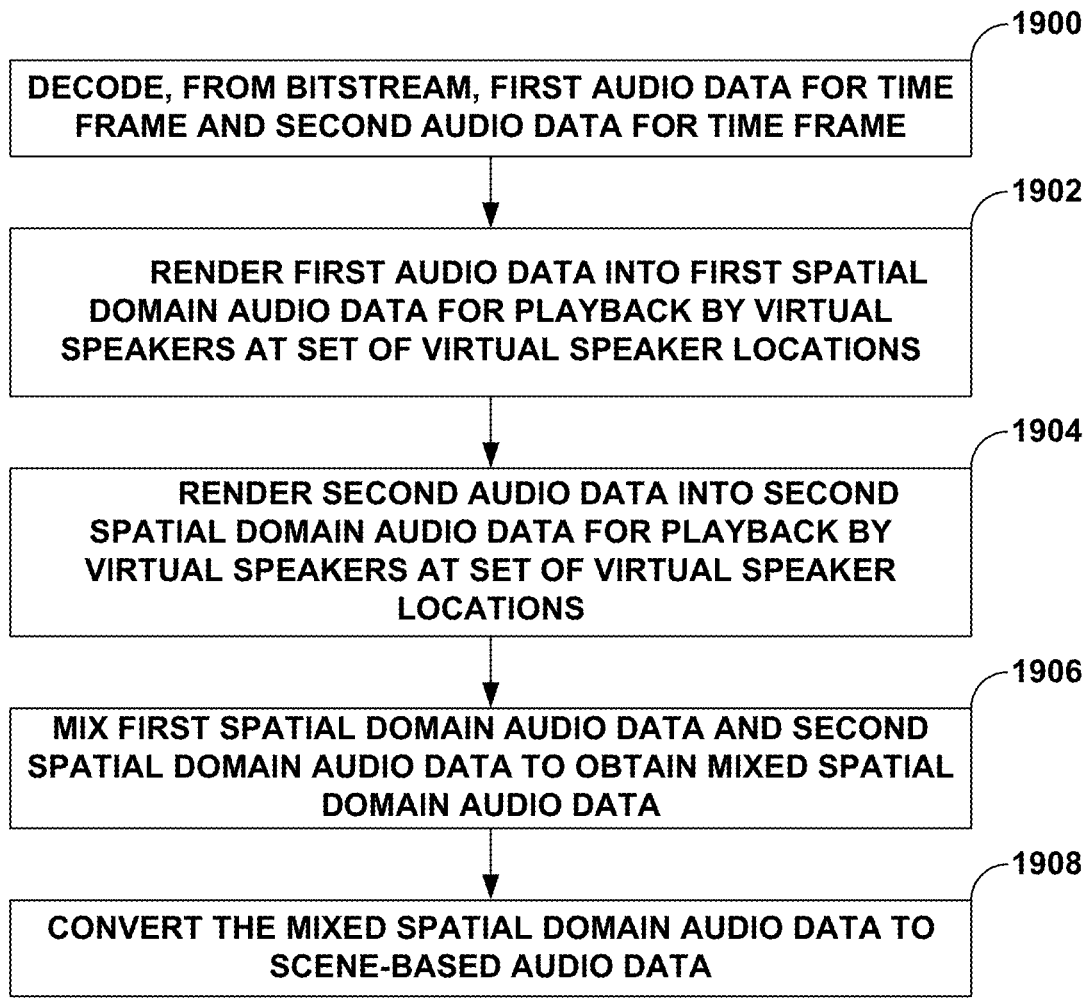
FIG. 9 is a flowchart illustrating example operation of the audio playback system shown in the example of FIG. 7 in performing various aspects of the scalable unified rendering techniques.

FIG. 9 is a flowchart illustrating example operation of the audio playback system shown in the example of FIG. 7 in performing various aspects of the scalable unified rendering techniques. The CMR stream decoder 1706 may receive the bitstream 216 and decode, from the bitstream 216, first audio data 1703 for a given time frame and second audio data 1705 for the same time frame (1900). The CMR stream decoder 1706 may output the first audio data 1703 to the HOA-to-spatial domain conversion unit 1708, and output the second audio data 1705 to the object/channel-based renderer 1704.

The HOA-to-spatial domain conversion unit 1708 may render the first audio data 1703 into first spatial domain audio data 1731 for playback by virtual speakers at a set of virtual speaker locations 1721, as described above (1902). The HOA-to-spatial domain conversion unit 1708 may output the first spatial domain audio data 1731 to the mixing unit 1710. The object/channel-based renderer 1704 may render, as described above, the second audio data 1705 into spatial domain audio data 1733 for playback by the virtual speakers at the set of virtual speaker locations 1721 (1904). The object/channel-based renderer 1704 may output the second spatial domain audio data 1733 to the mixing unit 1710.

The mixing unit 1710 may mix the first spatial domain audio data 1731 and the second spatial domain audio data 1733 to obtain mixed spatial domain audio data 1735 (1906). The mixing unit 1710 may output the mixed spatial domain audio data 1735 to the HOA converter 1712, which may convert the mixed spatial domain audio data 1735 to scene-based audio data 1737 (1908).

In some examples, the HOA converter 1712 may transmit the scene-based audio data 1737 to the wireless headset 220, which incorporates the HOA renderer 1714 to facilitate adapting the rendering matrix in near-real time based on the motion sensing data 221 as described above in more detail. In other instances, the audio playback system 218 may include the HOA renderer 1714 and perform the above noted adaptation of the rendering matrix based on motion sensing data 221.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device configured to support unified audio rendering, the device comprising:
an audio decoder configured to decode, from a bitstream, first audio data for a time frame and second audio data for the time frame;
a memory configured to store the first audio data and the second audio data; and
one or more processors configured to:
determine, based on headset capability data representative of one or more capabilities of a headset and prior to rendering the first audio data and the second audio data, a set of virtual speaker locations at which the virtual speakers are located;
render the first audio data into first spatial domain audio data for playback by virtual speakers at the set of virtual speaker locations;
render the second audio data into second spatial domain audio data for playback by the virtual speakers at the set of virtual speaker locations;
mix the first spatial domain audio data and the second spatial domain audio data to obtain mixed spatial domain audio data; and
convert the mixed spatial domain audio data to scene-based audio data.

2. The device of claim 1,
wherein the first audio data comprises one of first scene-based audio data, first channel-based audio data, or first object-based audio data, and
wherein the second audio data comprises one of second scene-based audio data, second channel-based audio data, or second object-based audio data.

3. The device of claim 1,
wherein the one or more processors are configured to transform the mixed spatial domain audio data from the spatial domain to a spherical harmonic domain, and
wherein the scene-based audio data comprises higher order ambisonic audio data defined in the spherical harmonic domain as a set of one or more higher order ambisonic coefficients corresponding to spherical basis functions.

4. The device of claim 1, wherein the set of virtual speaker locations comprises a set of virtual speaker locations uniformly distributed about a sphere in which a head of a listener is positioned at a center of the sphere.

5. The device of claim 1, wherein the set of virtual speaker locations include Fliege points.

6. The device of claim 1,
wherein the one or more processors are configured to render, based on headset-captured audio data, the first audio data to obtain the first spatial domain audio data, wherein the headset-captured audio data comprises audio data representing sounds detected by a headset, and
wherein the one or more processors are configured to render, based on the headset-captured audio data, the second audio data to obtain the second spatial domain audio data.

7. The device of claim 1, further comprising an interface configured to transmit, to the headset, the scene-based audio data.

8. The device of claim 1, wherein the headset comprises a wireless headset.

9. The device of claim 1, wherein the headset comprises a computer mediated reality headset that supports one or more of virtual reality, augmented reality, and mixed reality.

10. The device of claim 1,
wherein the one or more audio decoder is further configured to decode, from the bitstream, third audio data for the time frame,
wherein the memory is further configured to store the third audio data,
wherein the one or more processors are further configured to render the third audio data into third spatial domain audio data for playback by the virtual speakers at the set of virtual speaker locations, and
wherein the one or more processors are configured to mix the first spatial domain audio data, the second spatial domain audio data, and the third spatial domain audio data to obtain the mixed spatial domain audio data.

11. A method of supporting unified audio rendering, the method comprising:

decoding, by a computing device and from a bitstream, first audio data for a time frame and second audio data for the time frame;

determining, based on headset capability data representative of one or more capabilities of a headset and prior to rendering the first audio data and the second audio data, a set of virtual speaker locations at which the virtual speakers are located;

rendering, by the computing device, the first audio data into first spatial domain audio data for playback by virtual speakers at the set of virtual speaker locations;

rendering, by the computing device, the second audio data into second spatial domain audio data for playback by the virtual speakers at the set of virtual speaker locations;

mixing, by the computing device, the first spatial domain audio data and the second spatial domain audio data to obtain mixed spatial domain audio data; and converting, by the computing device, the mixed spatial domain audio data to scene-based audio data.

12. The method of claim 11,
wherein the first audio data comprises one of first scene-based audio data, first channel-based audio data, or first object-based audio data, and
wherein the second audio data comprises one of second scene-based audio data, second channel-based audio data, or second object-based audio data.

13. The method of claim 11,
wherein converting the mixed spatial domain audio data comprises transforming the mixed spatial domain audio data from the spatial domain to a spherical harmonic domain, and
wherein the scene-based audio data comprises higher order ambisonic audio data defined in the spherical harmonic domain as a set of one or more higher order ambisonic coefficients corresponding to spherical basis functions.

14. The method of claim 11, wherein the set of virtual speaker locations comprises a set of virtual speaker locations uniformly distributed about a sphere in which a head of a listener is positioned at a center of the sphere.

15. The method of claim 11, wherein the set of virtual speaker locations include Fliege points.

16. The method of claim 11,
wherein rendering the first audio data comprises rendering, based on headset-captured audio data, the first audio data to obtain the first spatial domain audio data, wherein the headset-captured audio data comprises audio data representing sounds detected by a headset, and
wherein rendering the second audio data comprises rendering, based on the headset-captured audio data, the second audio data to obtain the second spatial domain audio data.

17. The method of claim 11, further comprising transmitting, to the headset, the scene-based audio data.

18. The method of claim 11, wherein the headset comprises a wireless headset.

19. The method of claim 11, wherein the headset comprises a computer mediated reality headset that supports one or more of virtual reality, augmented reality, and mixed reality.

20. The method of claim 11, further comprising:
decoding, from the bitstream, third audio data for the time frame; and
rendering the third audio data into third spatial domain audio data for playback by the virtual speakers at the set of virtual speaker locations,
wherein mixing the first spatial domain audio data and the second domain audio data comprises mixing the first spatial domain audio data, the second spatial domain audio data, and the third spatial domain audio data to obtain the mixed spatial domain audio data.

21. A device configured to support unified audio rendering, the device comprising:
means for decoding, from a bitstream, first audio data for a time frame and second audio data for the time frame;
means for determining, based on headset capability data representative of one or more capabilities of a headset and prior to rendering the first audio data and the second audio data, a set of virtual speaker locations at which the virtual speakers are locate;
means for rendering the first audio data into first spatial domain audio data for playback by virtual speakers at the set of virtual speaker locations;
means for rendering the second audio data into second spatial domain audio data for playback by the virtual speakers at the set of virtual speaker locations;
means for mixing the first spatial domain audio data and the second spatial domain audio data to obtain mixed spatial domain audio data; and
means for converting the mixed spatial domain audio data to scene-based audio data.

22. A non-transitory computer-readable storage medium having stored thereon instructions that, when executed, cause one or more processors to:
decode, from a bitstream, first audio data for a time frame and second audio data for the time frame;
determine, based on headset capability data representative of one or more capabilities of a headset and prior to rendering the first audio data and the second audio data, a set of virtual speaker locations at which the virtual speakers are located;
render the first audio data into first spatial domain audio data for playback by virtual speakers at the set of virtual speaker locations;
render the second audio data into second spatial domain audio data for playback by the virtual speakers at the set of virtual speaker locations;
mix the first spatial domain audio data and the second spatial domain audio data to obtain mixed spatial domain audio data; and
convert the mixed spatial domain audio data to scene-based audio data.

* * * * *